United States Patent

Wittler et al.

[15] 3,676,908
[45] July 18, 1972

[54] BROADENING AND STRETCHING ROLLER FOR FLEXIBLE WEBS

[72] Inventors: Hans Wittler; Heinz-Otto Holtkamp, both of Brackwede, Germany

[73] Assignee: H. Wittler & Co. KG, Brackwede, Germany

[22] Filed: Nov. 9, 1970

[21] Appl. No.: 88,078

[30] Foreign Application Priority Data

Nov. 12, 1969 Germany............... P 19 56 846.8

[52] U.S. Cl..................................................29/116 AD
[51] Int. Cl....................................................B21b 13/02
[58] Field of Search...................29/116 R, 116 AD, 132

[56] References Cited

UNITED STATES PATENTS

| | | | |
|---|---|---|---|
| 2,173,250 | 9/1939 | Fay | 29/116 R X |
| 2,393,191 | 1/1946 | Robertson | 29/116 R X |
| 2,952,889 | 9/1960 | Hanssen | 29/116 R X |
| 3,328,866 | 7/1967 | Robertson | 29/116 AD |
| 3,406,438 | 10/1968 | Reilly | 29/116 R |
| 3,500,524 | 3/1970 | Jagminas | 29/116 R |
| 3,520,747 | 7/1970 | McGaughey | 29/132 |
| 3,595,207 | 7/1971 | Stricker | 29/132 |

*Primary Examiner*—Alfred R. Guest
*Attorney*—W. G. Fasse

[57] ABSTRACT

This invention relates to a broadening and stretching roller for flexible webs such as webs of textile, paper or plastics material. An outer shell of the roller is mounted on a shaft by means of bearings which in turn are secured between the shell and the shaft by mounting means comprising end cups, tubular section members, and ring means. All of these bearing mounting means are made of plastics material such as duro-plastics or thermo-plastics. Corrosion resistant sleeves of metal and/or of plastics material are secured to the end of the shaft in such position as to be partially overlapped by said end cups.

15 Claims, 7 Drawing Figures

Patented July 18, 1972

BROADENING AND STRETCHING ROLLER FOR FLEXIBLE WEBS

BACKGROUND OF THE INVENTION

The present invention relates to broadening and stretching rollers having an elastic roller shell and a curved, bent, or an adjustable steel shaft. These rollers are employed for stretching flexible materials such as webs of textiles, papers, or plastics material. The outer shell is supported on said shaft by means of bearings such as roller bearings, ball bearings or needle bearings, or the like.

Broadening and stretching rollers are employed frequently in industry not only where such rollers are operated in relatively dry environment but also where the roller is subject to influences of liquids, dusts, and similar influences which shorten the usefull life of the bearing means.

Especially in connection with broadening and stretching rollers wherein the internal structural parts are made of steel, corrosion of such steel parts poses a substantial problem with regard to the useful life of the roller. Even in those instances where the internal structure of the stretching roller is substantially sealed against the environment so that normally humidity cannot enter into the roller, the use of such rollers in washing compartments or the like causes difficulties because the temperature changes result in the formation of condensation water inside the stretching roller upon reaching of the dew point. This condensation water causes the corrosion of the steel parts of the internal roller structure in a very short time. These steel parts are in direct contact with the bearing means. As a result, the bearing means are also subject to increased corrosion. When the bearing means corrode they tend to be stuck and the stretching roller becomes unusable already after a short period of operation so that it must be removed from the machine of which it forms a part and the defective bearing means must be replaced. Such roller removal and bearing replacement requires a substantial amount of time and as a result increases the production costs.

The above outlined drawbacks have so far not been overcome.

OBJECTS OF THE INVENTION

In view of the foregoing it is the aim of the invention to achieve the following objects:

to overcome the outlined drawbacks and to increase the usefull life of the stretching roller;

to avoid the corrosion problems in stretching rollers by replacing all the mounting means for the bearings by mounting means which are not subject to corrosion even under adverse operating conditions;

to improve the sealing characteristics so that the bearing means themselves are less subject to corrosion even under adverse operating conditions;

to avoid a direct contact of the bearing means with steel parts so that the corrosion of such steel parts cannot enhance the corrosion of the bearing means;

to reduce the production costs by increasing the usefull life of the stretching rollers even under adverse operating conditions.

SUMMARY OF THE INVENTION

According to the invention the above objects have been achieved in a broadening and stretching roller having an elastic shell and a steel shaft which is either bent, rigid, or adjustable and on which the shell is supported by supporting bodies including tubular section members at least some of which have mounted therein bearing means, and by end cups which also have mounted therein bearing means. Between adjacent tubular section members and between an end cup and the next adjacent tubular section member there are arranged connecting or intermediate rings which are not directly supported on the shaft, all of the mounting means for the shell and bearing means are made, according to the invention, of plastics material such as duro-plastics and/or thermoplastics material and the steel shaft of the roller is provided in the range of said end cups with a corrosion resistant sleeve or coating also made of a plastics material or of a corrosion resistant metal.

BRIEF FIGURE DESCRIPTION

In order that the invention may be clearly understood, it will now be described, by way of example, with reference to the accompanying drawings, wherein.

DESCRIPTION OF AN EXAMPLE EMBODIMENT

Figure 1:
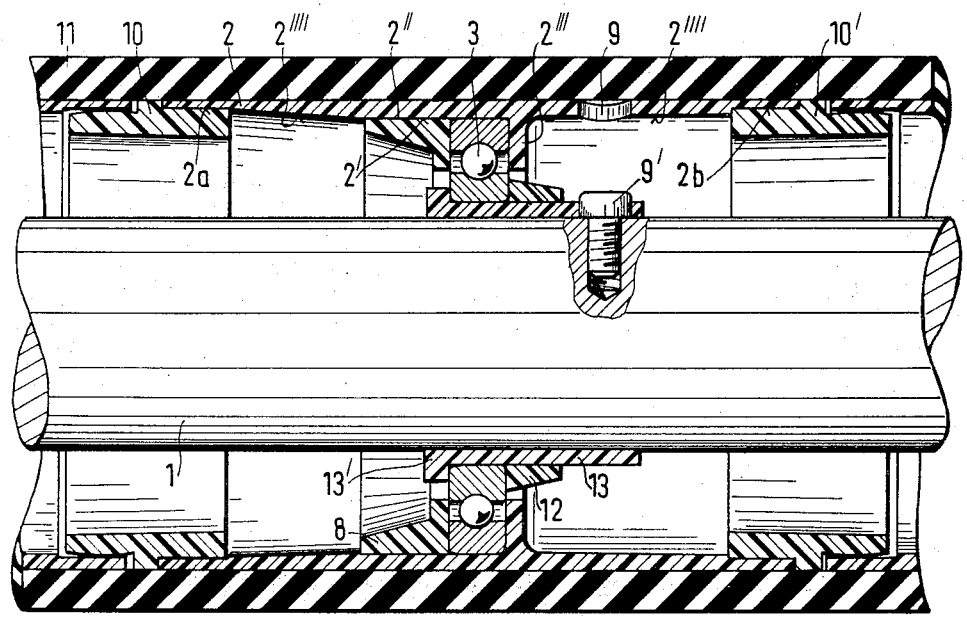
FIG. 1 illustrates a sectional view of a portion intermediate the ends of a broadening and stretching roller according to the invention, especially illustrating the position of a tubular section member and ring means for the mounting of bearing means and spacing or connecting ring means to adjacent sections not shown in FIG. 1.

Referring to FIG. 1 there is shown a rigid shaft 1 on which is mounted a shell 11 of elastic material. The shell is rotatable relative to the shaft 1 by means of bearings 3 mounted in a tubular section member 2. Each of the tubular section members 2 is of a single piece construction and according to the invention they are made of a plastics material of the duro-plastics or thermo-plastics types which are well known in the art.

Figure 3:
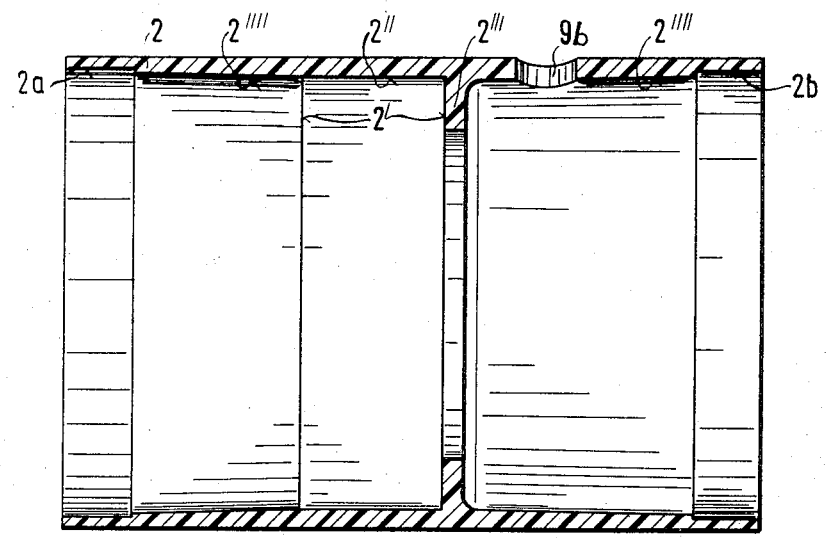
FIG. 3 is an axial sectional view of a tubular section member.

The tubular section member 2 comprises a central portion 2' having a length corresponding to about twice the width of the bearing 3. The wall thickness of the tubular section center portion 2' is constant. Stated differently, such center portion has an inner cylindrical wall to provide a seat 2'' for the bearing 3. Each tubular section member is further provided with a radially inwardly directed ring shoulder 2''' as best seen in FIG. 3. The ring shoulder 2''' is located adjacent to said bearing seat 2'' next to the center portion 2'. The tubular section member further comprises two end portions extending axially outwardly relative to said center portion.

Said end portions preferably have an inner diameter which increases slightly from said center portion axially outwardly toward outer ends 2a and 2b, whereby said end portions between the center portion and the ends have a conical inner wall 2''''.

Said outer ends 2a and 2b of the tubular section member have preferably a cylindrical inner wall and an inner shoulder between said cylindrical inner wall and the adjacent conical wall 2''''.

Figure 7:
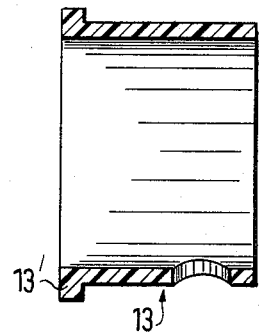
FIG. 7 shows a bearing bushing as used inside a tubular section member and shown in assembled position in FIG. 1.

Referring further to FIGS. 1 and 7 there is shown a bearing bushing 13 which is secured to the shaft 1 by means of a screw 9' which may be inserted through a hole 9 in the tubular section member 2. The bearing bushing 13 is provided with a shoulder 13' against which the inner race of the bearing 3 may be seated as will be described more fully below.

Figure 2:
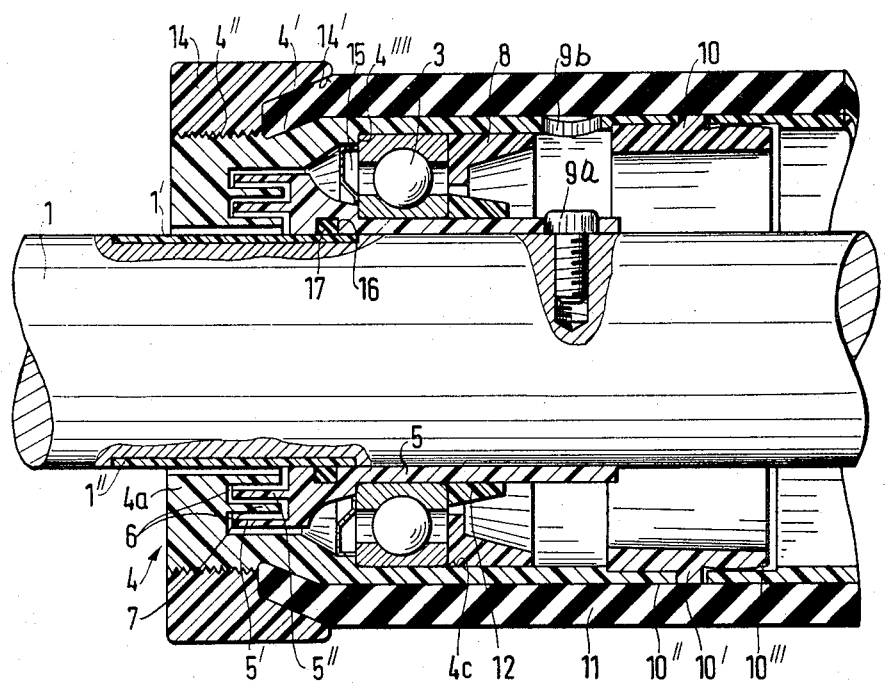
FIG. 2 illustrates a sectional view of an end portion of a roller according to the present invention including end cup and ring means also for supporting a bearing as well as means for securing the shell.
Figure 4:
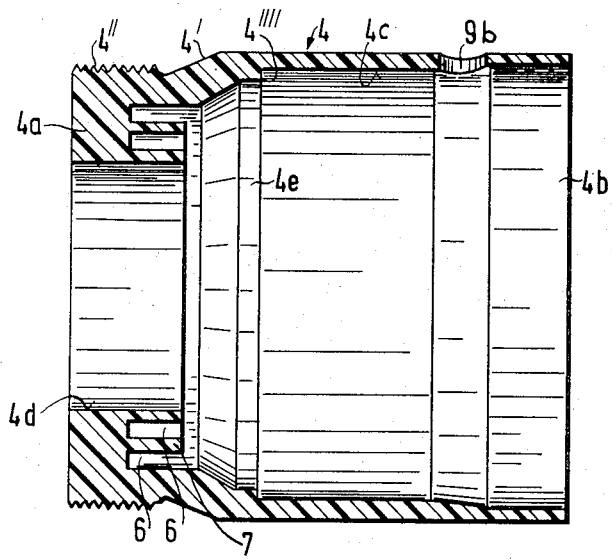
FIG. 4 shows a sectional view of an end cup as also seen in FIG. 2.
Figure 5:
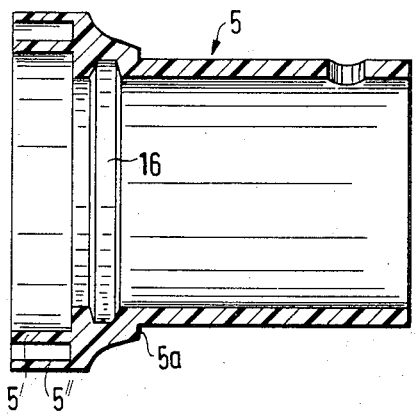
FIG. 5 is a bearing bushing forming part of the two piece construction of the end cup whereby the element shown in FIG. 4 forms the first piece.

Referring now to FIGS. 2, 4 and 5 there is shown an end cup 4 made of plastics material and formed as a two piece structure comprising a first piece having an axially outwardly extending closure member 4a and an end member 4b. Intermediate the closure member 4a and the end member 4b there is a center portion 4c and a slanting portion 4' connecting the center portion 4c to the closure member 4a. An inner shoulder 4'''' is provided between the center portion 4c which has a cylindrical wall to provide a bearing seat, and a further narrow cylindrical portion 4e. The shoulder 4'''' limits axial movement of the bearing in one direction. Securing the bearing against axial movement in the opposite direction will be described below.

The cylindrical center portion 4c has an inner diameter corresponding to the outer diameter of the bearing means 3 whereas the closure member 4a has an axially extending central bore 4d having an inner diameter corresponding substantially to the diameter of the shaft 1. The closure member or portion 4a has an inwardly directed face in which there are provided concentric grooves 6 separated from each other by respective ring walls 7. The second piece of the end cup is provided in the form of a bearing bushing 5 as best seen in FIG. 5. The bearing bushing 5 provides a seat for the bearing and a shoulder 5a which also limits the axial movement of the bearing in one direction, that is in the same direction as said shoulder 4''''. Preferably said shoulders 5a and 4'''' extend in the same plane radially relative to the longitudinal axis of the shaft 1. The bearing bushing 5 is provided with concentric projecting rings 5' and 5'' which fit into the concentric grooves 6 between the ring walls 7 of the closure portion 4a.

The bearing bushing 5 is also fixed to the shaft 1 by means of a screw 9a which may be inserted through a respective hole 9b in the end cup 4.

The concentric grooves 6 of the closure portion 4a cooperate with the projecting concentric rings 5' and 5'' of the bearing bushing 5 to form a sealing labyrinth which is preferably filled with a sealing medium such as grease.

As described the bearing 3 is located with its inner race on the seat provided by the bearing bushing 5 and with its outer race it is held in the seat provided by the center portion 4c of the cup 4. In addition the bearing is secured against axial movement by rings 8 and 12 (FIG. 2) which are also made of plastics material. The ring 8 is secured to the inner cylindrical wall of the center portion 4c, for example by means of glue or in any other suitable manner. The positioning ring 12 is secured to the bearing bushing 5 in the same manner, for example by glue. The just described positioning rings 8 and 12 shown in FIG. 2 are also present in FIG. 1 and are secured to the center portion 2' of the tubular section member 2 and to the bearing bushing 13 respectively as shown in FIG. 1, whereby the bearing means are secured against axial movement by the cooperation of said rings 8 and 12 and the shoulder 13' as well as the shoulder 2'''. Since the bearing locating means are also made of plastics material, the bearings are substantially surrounded by corrosion resistant elements.

Referring to FIG. 2 there is further shown a sealing ring 15 which seals the bearing means relative to said sealing labyrinth which as mentioned may be filled with grease. The sealing ring is held in a cylindrical portion or narrow cylindrical portion 4e adjacent to the shoulder 4'''' in the end cup 4 (FIG. 4).

Referring to FIG. 5 there is further shown an inner groove 16 which receives a sealing ring 17, for example an O-ring.

It will be appreciated that it is not necessary to provide each tubular section member 2 with a bearing 3. Thus, it is, for example, possible to provide every other tubular section member with a bearing and to omit the bearing also in every other intermediate tubular section member.

Figure 6:
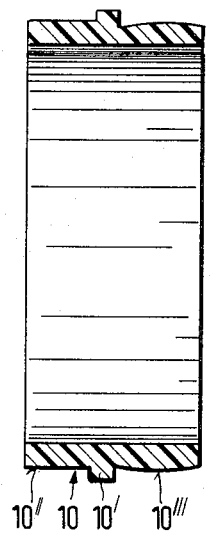
FIG. 6 illustrates a connecting or intermediate spacing ring in a sectional view for joining two adjacent tubular section members or a tubular section member and an end cup.

The adjacent tubular section members, regardless whether or not they are provided with a bearing means are interconnected with each other by connecting or intermediate rings 10 which are also employed for interconnecting an end cup and the next adjacent tubular section member as best seen in FIG. 2. These connecting rings 10 are also made of plastics material as a single piece structure. Each connecting ring comprises a cylindrical portion 10'', a radially outwardly bulging portion 10''' and an intermediate portion 10' as best seen in FIG. 6. The intermediate portion 10' is formed as a radially outwardly extending ridge between said cylindrical portion and the bulging portion. It will be noted that the outer diameters of said cylindrical portion 10'' and said bulging portion 10''' are so dimensioned that these portions fit into the cylindrical ends 2a, 2b of the tubular section member 2 or into the cylindrical end 4b of the cup 4.

As noted, the roller is provided substantially along its entire length with said outer shell 11 of elastic material. The ends of the shell are clamped against the slanting portion 4' of the end cup 4 by clamping means 14. The clamping means 14 may be provided in the form of a nut having an inwardly slanting portion 14' and an inner thread which cooperates with an outer thread 4'' on the closure portion 4a of the end cup 4. By tightening the clamping nut 14 ends of the shell 11 are pressed against said slanting portion 4' whereby the shell is securely held in its position on the roller.

It is an essential feature of the invention that the steel shaft 1 is provided at both ends 1' with a sleeve or coating 1'' which is also made of a plastics material or which may be provided in the form of a corrosion resistant metal coating. In any event, the sleeve 1'' extends over an area of the shaft 1 so that it is at least partially overlapped by the two pieces 4 and 5 of the end cup. This feature in combination with the further feature of the invention that all structural parts with the exception of the bearing means 3 and the sealing ring 15 are made of duro- and/or thermo-plastics material assures the substantially complete encapsulation of the bearings by structural elements made of plastics material. The particular shape and structural characteristics of the individual elements as well as their structural cooperation are also considered to be features of the present invention.

The special advantage of the invention is seen in that the broadening and stretching roller if constructed as taught by this invention is prevented from corroding due to the fact that except for the shaft and the bearings all other elements are made of plastics material or of corrosion resistant material. As a result, repairing requirements are substantially reduced. Any condensation water cannot cause the corrosion of the plastics material elements and thus, the transfer of rust onto the bearing means is substantially excluded especially because the bearings are substantially completely encapsulated and filled with grease. Any condensation water is prevented from reaching the bearings much more effectively than in prior art rollers with steel encapsulating means.

A further advantage is seen in the highly efficient and inexpensive construction of the labyrinth for the sealing medium which labyrinth comprises only two cooperating members, namely two parts of the end cup.

Yet another advantage of the invention is seen in that the use of structural parts made of plastics material reduces substantially the weight of the entire roller, whereby the load on the axis having a given length may be increased or where the load remains constant the length of the axis may be increased which also results in a reduction of the overall costs.

Although the invention has been described with reference to specific embodiments it is intended to cover all modifications and equivalents within the scope of the appended claims.

What we claim is:

1. In a broadening and stretching roller for flexible webs having roller body means, a shaft of given diameter, and bearing means of given width for supporting said roller body means on said shaft, as well as mounting means for securing said bearing means between the shaft and the roller body means, said mounting means including tubular section members, end cups, and ring means, said bearing means being located in at least some of said tubular section members and in said end cups for supporting the tubular section members and the end cups on said shaft, the improvement comprising, corrosion resistant sleeve means located on said shaft and at least partially between the shaft and said end cups, and wherein said mounting means are made of plastics material.

2. The broadening and stretching roller according to claim 1, wherein said corrosion resistant sleeve means is a corrosion resistant metal coating on said shaft.

3. The broadening and stretching roller according to claim 1, wherein said corrosion resistant sleeve means is made of plastics material.

4. The broadening and stretching roller according to claim 1, wherein said mounting means are made of duro-plastics material.

5. The broadening and stretching roller according to claim 1, wherein said mounting means are made of thermo-plastics material.

6. The broadening and stretching roller according to claim 1, wherein each of said tubular section members of plastics material comprises a single piece tubular structure having a center portion with a length corresponding substantially to twice said given width of said bearing means, said center portion having a constant wall thickness throughout its length to provide a seat for said bearing means and a radially inwardly directed ring shoulder located adjacent to said bearing seat, said tubular structure further having two end portions of which one is located on each side of said center portion.

7. The broadening and stretching roller according to claim 6, wherein said end portions of the tubular structure have axially extending outer ends and an inner diameter which increases slightly from said center portion axially outwardly toward said outer ends whereby said end portions have a conical inner wall.

8. The broadening and stretching roller according to claim 7, wherein said outer ends have a cylindrical inner wall and an inner shoulder between said cylindrical inner wall and the adjacent conical inner wall.

9. The broadening and stretching roller according to claim 1, wherein each of said end cups of plastics material comprises a two piece structure including a first piece having an axially outwardly extending closure member, an end portion extending axially inwardly relative to the roller and a center portion between the closure member and said end portion, as well as a slanting portion connecting the center portion and the closure member, said center portion having an inner diameter corresponding to the outer diameter of said bearing means, said closure member having a bore therethrough extending concentrically to said shaft and having an inner diameter corresponding substantially to said given diameter of the shaft, said closure member having an inward face and concentric grooves separated by respective ring walls in said inward face, and a second piece formed as a bushing having an outer diameter forming a seat for said bearing means and a sealing end portion provided with concentric projecting rings which fit into the concentric grooves between said ring walls of said closure member of the first piece.

10. The broadening and stretching roller according to claim 9, further comprising a corrosion protected sealing ring, said concentric grooves with their respective ring walls of the first piece and the concentric projecting rings of the second piece forming a labyrinth for receiving a sealing medium, said corrosion protected sealing ring being located between said bearing means and said labyrinth for sealing the latter from said bearing means.

11. The broadening and stretching roller according to claim 6, wherein said ring means comprise bearing means locating rings of plastics material positioned in said tubular section members for holding a respective one of said bearing means in a fixed position against said ring shoulder.

12. The broadening and stretching roller according to claim 9, further comprising shoulder means defined inside at least one of said first and second pieces of the end cups adjacent to the seat for said bearing means, and wherein said ring means comprise bearing means locating rings of plastics material positioned in said end cups for holding a respective one of said bearing means in a fixed position against said shoulder means.

13. The broadening and stretching roller according to claim 1, wherein said ring means comprise connecting rings of plastics material located between adjacent tubular section members as well as between an end cup and an adjacent tubular member, each of said connecting rings comprising a single piece ring having a cylindrical portion, a radially outwardly bulging portion, and an intermediate portion with a radially outwardly extending ridge between the cylindrical portion and the bulging portion.

14. The broadening and stretching roller according to claim 1, wherein said bearing mounting means are so dimensioned that said bearing means are surrounded by plastics material.

15. The broadening and stretching roller according to claim 9, wherein said closure member has an outer threading thereon, said roller further comprising a cylindrical shell of elastic material and shell securing means having a bore with an inner thread and a inwardly slanting edge, said inner thread fitting on said outer threading of the closure member whereby said edge surrounds the ends of the shell to press said ends against the slanting portion of the respective end cup.

* * * * *